Sept. 13, 1960

F. M. M. B. SALOMON 2,952,235

APPARATUS ADAPTED TO PRODUCE MECHANICAL
IMPULSES OF ALTERNATING OPPOSITE
DIRECTIONS ON A FRAME

Filed July 11, 1958

Sept. 13, 1960 F. M. M. B. SALOMON 2,952,235
APPARATUS ADAPTED TO PRODUCE MECHANICAL
IMPULSES OF ALTERNATING OPPOSITE
DIRECTIONS ON A FRAME
Filed July 11, 1958 2 Sheets-Sheet 2

2,952,235
APPARATUS ADAPTED TO PRODUCE MECHANICAL IMPULSES OF ALTERNATING OPPOSITE DIRECTIONS ON A FRAME

François Marie Michel Bernard Salomon, 11 Rue de l'Universite, Paris, France

Filed July 11, 1958, Ser. No. 748,092

Claims priority, application France July 16, 1957

6 Claims. (Cl. 114—125)

My invention has for its object an apparatus adapted to produce opposed mechanical impulses of alternating opposite directions on a frame.

Said apparatus is particularly, but not exclusively, intended for opposing the oscillations of the frame on which it is fitted and chiefly for preventing or reducing the oscillations of ships forming the well known pitching and rolling movements.

My invention covers chiefly the utilization of the variations in the momentum of a liquid mass operating in a closed circuit at a substantially constant speed under the conditions disclosed hereinafter.

For sake of clarity and without this leading to any limitation in the scope of my invention as defined in the accompanying claims, I will first consider the application of my invention to the damping of the rolling movements of a ship.

It will be assumed, considering only the main phenomenon, that the apparatus is provided with an axis of substantial symmetry and that said axis is approximately parallel with the average axis of the rolling movement. This axis may be termed the main axis of the apparatus.

Under such conditions, and taking into account the fact that a certain mass $\mu$ of liquid is considered as flowing inside a pipe rigid with the ship at a speed V and at a distance R from the main axis, it is necessary to mention the following facts:

(a) The momentum of the mass $\mu$ is by definition the product of the mass by the speed $\mu V$.

(b) The moment of said momentum with reference to the main axis of the apparatus is by definition the product $M=\mu VR$.

(c) If the product $\mu VR$ is variable, the liquid mass exerts on the ship a torque C, the value of which with reference to the main axis is equal to $$C = -\frac{dM}{dt}$$

as a consequence of the theorem governing the torques produced by momentums.

(d) The value of said torque C is the same with reference to any axis parallel with the main axis and, consequently, with reference to the average rolling axis, as a consequence of a well-known theorem, assuming the movement of the center of gravity of the liquid mass is negligible with reference to the other parameters.

It is therefore not necessary for the main axis of the apparatus to register with the average rolling axis and it is sufficient for it to be substantially parallel therewith.

In order to obtain a torque opposing the rolling, it is therefore sufficient to make the amount $M=\mu VR$ vary with time according to a suitable law.

Arrangements are already known which resort to modifications in speed accelerations and braking of a liquid mass.

In contradistinction, my invention resorts to the use of a liquid mass flowing under substantially constant speed conditions.

In an arrangement according to my invention: there exists at least one couple of circuits 1 and 2 constituted by channels secured to the hull. These circuits are advantageously formed in adjacent planes substantially perpendicular to said axis. Said circuits are interconnected by pipes adapted to be closed by valves.

In each of said circuits there flows a certain amount of liquid which varies at each moment whereas the total mass $m$ of liquid is constant.

Inside one circuit, the liquid progresses in a predetermined direction which I will consider for sake of simplicity as the positive direction. In the other circuit, the liquid flows in the direction opposed to the preceding direction.

The speed of flow V is substantially the same for each circuit and is substantially constant.

Assuming $m_1$ is a mass of liquid which at any given moment is contained inside the circuit and $m_2$ the mass of liquid which at the same moment flows through the other circuit, the sum $m_1+m_2$ is constant and is equal to the total mass of liquid $m$.

It may be assumed for sake of simplicity of my disclosure that the two circuits are identical and that their shape is substantially that of circular annuli having as an average radius R.

Under such conditions, at the time considered:

The moment of the momentum of the liquid contained in the first circuit is $M_1=m_1RV$;

The moment of the momentum of the liquid contained in the second circuit and flowing in the direction opposed to that of the liquid contained in the circuit 1 is:

$$M_2 = m_2 R(-V) = -m_2 RV$$

The total moment of the momentum for the entire mass of the liquid is:

$$M = M_1 + M_2 = m_1 RV - m_2 RV$$
$$M = (m_1 - m_2) RV$$

As mentioned hereinabove, if M is caused to vary, a torque is exerted on the ship, the value of which torque is equal to $$C = -\frac{dM}{dt}$$

Thus, $$C = -\frac{d}{dt}(m_1 - m_2) RV$$

Since R is constant and assuming V is also constant, $$C = -RV\frac{d}{dt}(m_1 - m_2)$$

In order to obtain a useful torque acting on the ship while maintaining a speed V of the liquid which is constant, it is therefore sufficient to provide for a suitable modification of the masses $m_1$ and $m_2$; in other words, it is sufficient to make a varying amount of liquid pass from the first circuit into the second circuit or reversely, while maintaining the constancy of its speed.

The circulation of the liquid and chiefly its distribution between the two circuits are controlled by at least one distributing system which may include, in particular, two or more valves.

As a result of the preceding disclosure, it is apparent that the circulation of liquid in the two circuits is substantially periodical if the conditions governing the rolling of the ship are also periodical; it is a known fact that the rolling phenomena are, in practice, of a more complex structure.

The operation of the distributing system is performed generally under the action of servo-control means constituted for instance by auxiliary motors acting on valves. The movements of said servo-control means are governed in their turn by at least one system executing the orders transmitted to it by at least one automatic calculating apparatus.

Said automatic calculating apparatus realizes certain functions which depend from the circumstances of the rolling. It is connected in a known manner with various measuring instruments measuring various operative factors, such as in particular the rolling angles, the pressure of the sea on the hull, etc. In order to measure said parameters, it is possible to use in a conventional manner as in the case of various anti-rolling arrangements which are now in use, apparatus units which are sensitive to various parameters which are to be resorted to with a view to reducing the rolling.

It is possible in particular to measure the rolling angle through pendulums, small gyroscopes and the like.

My invention shows essential differences with reference to the known arrangements which make use of moving liquids and it provides substantial advantages over such arrangements.

An essential difference consists in that the liquid used moves at a constant speed. The liquid is not subjected to any acceleration or to any braking. The total vis viva of the liquid $$\frac{1}{2}mV^2 = \frac{1}{2}m_1V^2 + \frac{1}{2}m_2V^2$$

is constant.

It is sufficient to produce said vis viva once and for all before the starting of the ship for instance and to provide low power motors for the upkeep of said vis viva and for compensating the small losses due to the flow of liquid in the pipes.

The use of small powers leads to a very marked improvement chiefly with reference to the anti-rolling apparatus already known in the art which collect water out of the sea and throw it out again and require a much larger expenditure of power.

Furthermore, my improved apparatus shows substantial advantages over anti-rolling apparatus of a known type which resort to the use of a liquid flowing in a closed circuit and wherein accelerations and braking actions are exerted on the liquid. As a matter of fact, such accelerations and braking actions require much larger powers.

My invention shows further advantages, to wit:

The mass of liquid used is comparatively very small since, for obtaining a given torque C, the circuit through which the liquid flows may readily show large operative radii of gyration;

The execution is a simple one and much simpler in particular than that of the anti-rolling apparatus resorting to gyroscopes;

The apparatus units according to my invention is less bulky and less heavy than the means incorporating tanks for the damping of the rolling motion;

They lead to no substantial modifications of the hull;
They are capable of an almost instantaneous response;
They may be readily obtained in mass production.

I have disclosed hereinafter, reference being made to the accompanying drawings, a number of embodiments given by way of a mere exemplification with a view to making my invention more readily understood. In said drawings.

Figure 3:
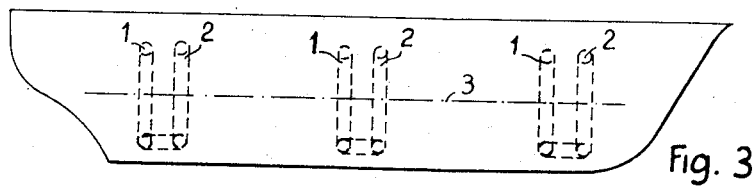

Fig. 3 relates to a particular embodiment of an antirolling apparatus including three couples of circuits.

Figure 4:
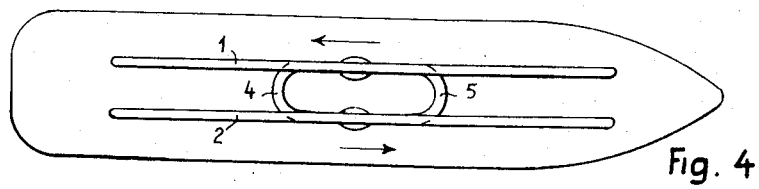
Figure 5:
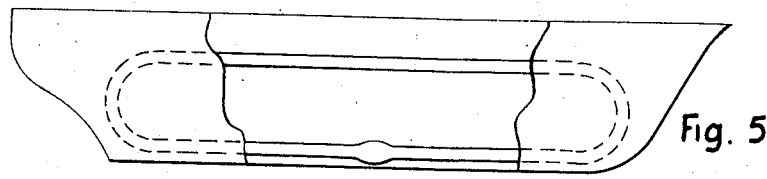
Figure 6:
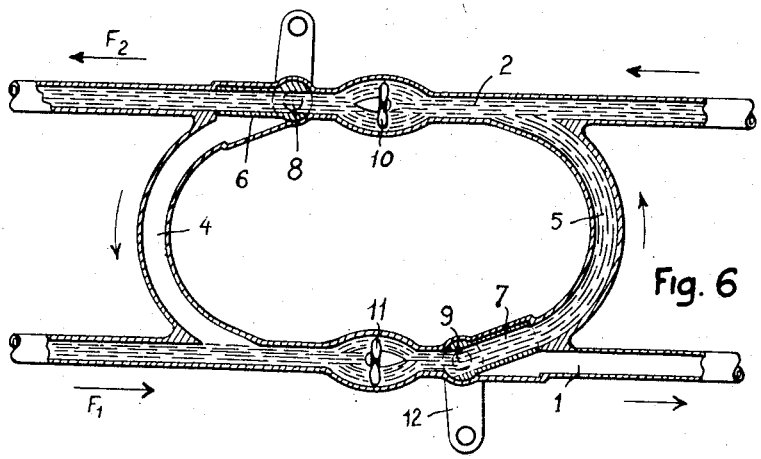

Figs. 4, 5 and 6 disclose an apparatus for reducing the pitching of a ship.

Figure 1:
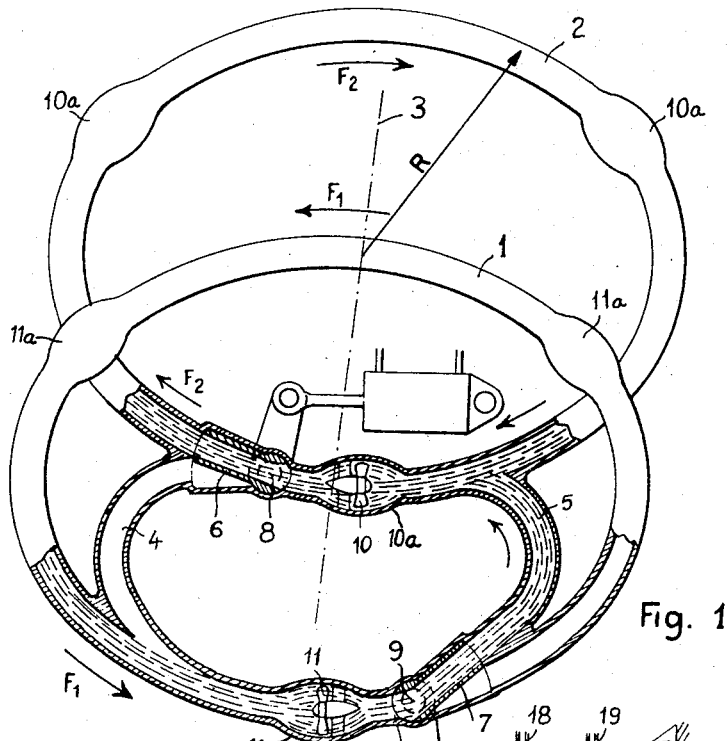
Fig. 1 is a diagram relating to an apparatus opposing the rolling motion of a ship.

Turning to Fig. 1 which is a diagrammatic perspective view of an embodiment of the circuits 1 and 2 in an apparatus opposing the rolling of ships, the circuit 1 is contained in a plane perpendicular to the main axis 3 which is itself parallel with the average axis of rolling.

The circuit 2 is contained in a second plane perpendicular to said axis 3.

Fig. 3 shows diagrammatically a plurality of couples of circuits 1 and 2 in side view, three such couples of circuits 1 and 2 being shown in said case.

Turning again to Fig. 1, it shows connecting pipes 4 and 5 inserted between the circuits 1 and 2 and the valves 6 and 7 adapted to move round their spindles 8 and 9. Said Fig. 1 also shows the parts required for the maintenance of the movement of the liquid. Said parts are illustrated diagrammatically by the rotors 10 and 11, respectively contained in the enlargements 10a and 11a of the circuits 1 and 2. The number of said rotors is irrelevant and is selected as equal to three in each circuit in the case of Fig. 1.

The operation of the apparatus is as follows: At each time $t$ a certain amount $m_1$ of liquid flows with a linear speed V in the circuit 1 in the direction of the arrow $F_1$. The moment of the momentum of this amount of liquid or its angular or kinetic momentum with reference to the axis 3 is equal to $M_1$. At the same moment, the amount of liquid $m_2$ flows through the circuit 2 in the direction of the arrow $F_2$ with a linear speed equal to $-V$. The moment of the momentum of said amount of liquid with reference to the axis 3 is equal to $M_2$.

As disclosed hereinabove, it is sufficient with a view to exerting a torque on the ship round an axis parallel with the rolling axis to constrain the liquid to pass from the circuit 1 into the circuit 2 or reversely which causes the masses $m_1$ and $m_2$ and, consequently, the moments $M_1$ and $M_2$ to vary.

This passage of liquid from one circuit to the other should be executed at a varying speed according to the case and according to the time, so as to give the abovementioned derivative $dm/dt$ the desired value at each instant $t$.

During its transfer between the two circuits, the liquid exerts on the pipes forming the circuits 1 and 2 and on the distributing parts therein torques which are precisely those which are necessary to oppose the rolling at said time $t$. These torques are transmitted to the hull of the ship through the pipes rigid therewith.

The transfer means operate as follows:

The positions assumed by the valves 6 and 7 as shown in Fig. 1 are such that the liquid is allowed to pass out of the circuit 1 into the circuit 2. Consequently, the absolute value of the moment $M_1$ of the momentum of the liquid in the circuit 1 decreases, while the absolute value of the moment $M_2$ increases.

Conversely, at the moment at which it is desired to exert on the hull a torque the direction of which opposes the torque precedingly applied, the valve 6 is caused to pivot round its spindle 8 so as to open into the connecting channel 4. The valve 7 pivoting round its spindle 9 opens into the circuit 1 so that the liquid flows out of the circuit 2 into the circuit 1.

The valves 6 and 7 are driven by auxiliary control members such as auxiliary motors, whether hydraulic, pneumatic or electric.

Fig. 1 shows hydraulic control means for the valves. The valve 7 carried by its spindle 9 is rigid with a crank 12 to which is pivotally secured at 13 to a rod 14 rigid with a hydraulic piston 15 adapted to move inside a cylinder 16. The cylinder itself may rock round a spindle 17 rigid with the frame.

Yielding channels 18 and 19 feed the liquid under pressure, which may be water or oil, into the cylinder 16 to either side of the piston, selectively.

The parts 10 and 11 used for the upkeep of the movements may be constituted in particular by pumps of a suitable type.

For given rolling conditions of the ship, the speed of said members is generally constant, but when the rolling conditions are modified, it may be of interest to modify their speed and for a considerable amount of rolling, the speed should be preferably larger than for a weaker rolling.

Figure 2:
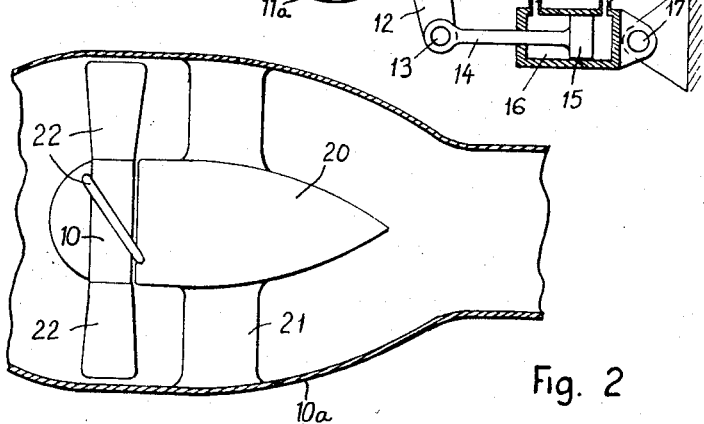
Fig. 2 illustrates a detail of Fig. 1.

Fig. 2 shows on a larger scale a member serving for the maintenance of the movement of the liquid.

20 designates diagrammatically the casing of an electric motor connected with the frame 10a through the arms 21. Said motor drives a rotor 10 which carries blades 22, the angular setting of which is possibly adjustable.

In these different modifications, the number of couples of circuits 1 and 2 depends on the application considered, on the tonnage of the ship, etc.

Figs. 4, 5 and 6 relate to an application of the invention for the reduction of the pitching of a ship. It is a well-known fact that pitching produces torques which are generally larger than rolling torques.

My invention allows reducing the pitching in variable proportions according to the case. The means used therefor are the same as for the reduction of the rolling. However, the liquid circuits 1 and 2 instead of extending round an axis parallel with the average rolling axis extend round one or more axes perpendicular to the longitudinal plane of the ship.

Said circuits 1 and 2 are assumed to be seen from above in Fig. 4 and they are interconnected by connections similar to those illustrated in Fig. 1.

In Fig. 5, the circuit system is assumed to be seen from one side through a section of the hull which has been torn off.

Fig. 6 shows distributing parts similar to those shown in Fig. 1 and operating in a similar manner, while the means serving for their maintenance are also similar to those illustrated in Fig. 1.

In the preceding disclosure, the shifting of the center of gravity of the liquid mass has not been taken into account. In certain cases, its effects may be objectionable. For instance, if I consider the case of Fig. 3, it is apparent that the center of gravity of the liquid mass is shifted between the planes of the circuits 1 and the planes of the circuits 2. This leads to inertia effects directed forwardly and then rearwardly and so on. There are cases where such a phenomenon shows no drawback. If it is objectionable, it is possible to resort to pairs of systems including each a circuit 1 and a circuit 2 and to arrange them in a manner such that the center of gravity of the liquid mass in each pair of circuit systems may be stationary or substantially stationary.

Similar arrangements may be provided in the case of anti-pitching apparatus illustrated in Fig. 4, so as to prevent an apparatus adapted to oppose pitching from producing rolling or the like disturbances. It is also possible in certain cases to resort to this shifting of the center of gravity so as to obtain useful effects. It is possible, within the scope of my invention as defined in the accompanying claims, to resort to the most varied forms of circuits and, in particular, to position the circuits 1 and 2 with reference to each other in a manner different from that illustrated by way of example in the accompanying figures, for instance, in a common plane and, generally speaking, in any desired manner whatever.

My invention may be modified in various manners within the scope of the accompanying claims and it is applicable for other purposes and, in particular, for the stabilization of aircrafts.

The nature of the liquid used may vary according to the case and be constituted, for instance, by water, oil, etc. The resistances opposed to the flow of liquid in the pipes may be reduced as much as possible through any known or suitable means and possibly through application in said circuit of a more or less considerable vacuum. The pipes forming the circuit should be inwardly as smooth as possible.

What I claim is:

1. In a structure subjected to oscillation forces, in combination, a frame rigid with said structure, an apparatus adapted to apply mechanical impulses in alternating directions to said frame to oppose the oscillations of said structure and including a first circuit defined by a first pipe rigidly secured to the frame and extending in a plane substantially perpendicular to the axis of the oscillations to be opposed, a second circuit defined by a second pipe secured to the frame and extending substantially in a plane parallel with that in which the first circuit extends, a first variable amount of liquid flowing in said first circuit in a first predetermined direction at a substantially constant speed, a second variable amount of liquid flowing in said second circuit in a direction opposed to that of said first predetermined direction at substantially the same speed as said first amount of liquid, the total amount of liquid contained in the two circuits being constant, at least one organ disposed in each circuit and adapted to maintain at a substantially constant value the speed of the liquid flowing in each circuit, and a pipe system interconnecting the two circuits and adapted to allow a shifting of liquid out of one of said circuits into the other and reversely, and means disposed on said pipe system to control said shifting of the liquid at appropriately selected instants.

2. In a ship subjected to oscillation forces, in combination, with the hull of said ship, an apparatus adapted to apply mechanical impulses in alternating directions to said hull to oppose the oscillations of said ship and including a first circuit defined by a first channel secured to the hull and extending in a plane substantially perpendicular to the axis of the oscillations to be opposed, a second circuit defined by a second channel secured to the hull and extending substantially in a plane parallel with that of the first circuit, a first variable amount of liquid flowing in said first circuit in a predetermined direction at a substantially constant speed, a second variable amount of liquid flowing in said second circuit in a direction opposed to said first-mentioned direction at substantially the same speed as that of the liquid in said first circuit, the total amount of liquid flowing through the two circuits being constant, at least one organ disposed in each circuit and adapted to maintain at a substantially constant value the speed of the liquid in each circuit a pipe system interconnecting the two circuits and adapted to allow a shifting of a fraction of the liquid selected out of one of the circuits into the other circuit and reversely, and means disposed on said pipe system to control said shifting of the liquid at appropriately selected instants.

3. In a ship subjected to rolling oscillations, in combination, the hull of the ship, an apparatus adapted to apply mechanical impulses in alternating directions to oppose the rolling oscillation of the ship and including a first circuit defined by a first channel secured to the hull and extending substantially in a plane perpendicular to the rolling axis of the ship, a second circuit defined by a second channel secured to the hull and substantially contained in a plane parallel with the plane in which the first circuit extends, a first variable amount of liquid flowing through said first circuit in a predetermined direction at a substantially constant speed, a second variable amount of liquid flowing in said second circuit in a direction opposed to that of the flow of liquid in said first circuit and at substantially the same speed as said first liquid, the total amount of liquid flowing through the two circuits being constant, at least one organ disposed in each circuit and adapted to maintain at a substantially constant value the speed of the liquid in each circuit, a pipe system interconnecting the two circuits and adapted to allow a shifting of a fraction of the liquid from one of the circuits into the other circuit and reversely, and means disposed on said pipe system to control said shifting of the liquid at appropriately selected instants.

4. In a structure subjected to oscillation forces, in combination, a frame rigid with said structure, an apparatus adapted to apply mechanical impulses in alternating directions to said frame to oppose the oscillations of said structure and including a first circuit defined by a first pipe rigidly secured to the frame and extending in a plane substantially perpendicular to the axis of the oscillations to be opposed, a second circuit defined by a second pipe secured to the frame and extending substantially in a plane parallel with that in which the first circuit extends, a first variable amount of liquid flowing in said first circuit in a first predetermined direction at a substantially constant speed, a second variable amount of liquid flowing in said second circuit in a direction opposed to that of said first direction at substantially the same speed as said first amount of liquid, the total amount of liquid contained in the two circuits being constant, at least one organ disposed in each circuit and adapted to maintain at a substantially constant value the speed of the liquid flowing in each circuit, a pipe system interconnecting the two circuits to allow a shifting of a fraction of liquid out of one circuit into the other and reversely, valves disposed on said pipe system and means controlling the opening and closing of the valves at appropriately selected instants.

5. In a structure subjected to oscillation forces, in combination, a frame rigid with said structure, an apparatus adapted to apply mechanical impulses in alternating directions to said frame to oppose the oscillations of said structure and including a first circuit defined by a first pipe, rigidly secured to the frame and extending in a plane substantially perpendicular to the axis of the oscillations to be opposed, a second circuit defined by a second pipe secured to the frame and extending substantially in a plane parallel with that in which the first circuit extends, a first variable amount of liquid flowing in said first circuit in a first predetermined direction at a substantially constant speed, a second variable amount of liquid flowing in said second circuit in a direction opposed to that of said first direction at substantially the same speed as said first amount of liquid, the total amount of liquid contained in the two circuits being constant, at least one organ disposed in each circuit and adapted to maintain at a substantially constant value the speed of the liquid flowing in each circuit, a pipe system interconnecting the two circuits to allow a shifting of a fraction of the liquid out of one of circuits into the other and reversely, valves disposed on said pipe systems and hydraulic means controlling the opening and closing of the valves at appropriately selected moments.

6. In a structure subjected to oscillation forces, in combination, a frame rigid with said structure, an apparatus adapted to apply mechanical impulses in alternating directions to said frame to oppose the oscillations of said structure and including a first circuit defined by a first pipe rigidly secured to the frame and extending in a plane substantially perpendicular to the axis of the oscillations to be opposed, a second circuit defined by a second pipe secured to the frame and extending substantially in a plane parallel with that in which said first circuit extends, a first variable amount of liquid flowing in said first circuit in a first predetermined direction at a substantially constant speed, a second variable amount of liquid flowing in said second circuit in a direction opposed to that of said first direction at substantially the same speed as said first amount of liquid, the total amount of liquid contained in the two circuits being constant, pumps disposed in each circuit and adapted to maintain a substantially constant value for the speed of the liquid flowing in each circuit, a pipe system interconnecting the two circuits and adapted to allow a shifting of a fraction of liquid out of one of the circuits into the other and reversely, and means disposed on said pipe system to control said shifting of the liquid at appropriately selected instants.

References Cited in the file of this patent

UNITED STATES PATENTS

| | | |
|---|---|---|
| 1,571,264 | Gretsch | Feb. 2, 1926 |
| 2,017,072 | Minorsky | Oct. 15, 1935 |